Oct. 16, 1923.
J. A. STEINMETZ
1,471,014
DISK WHEEL
Filed April 18, 1922
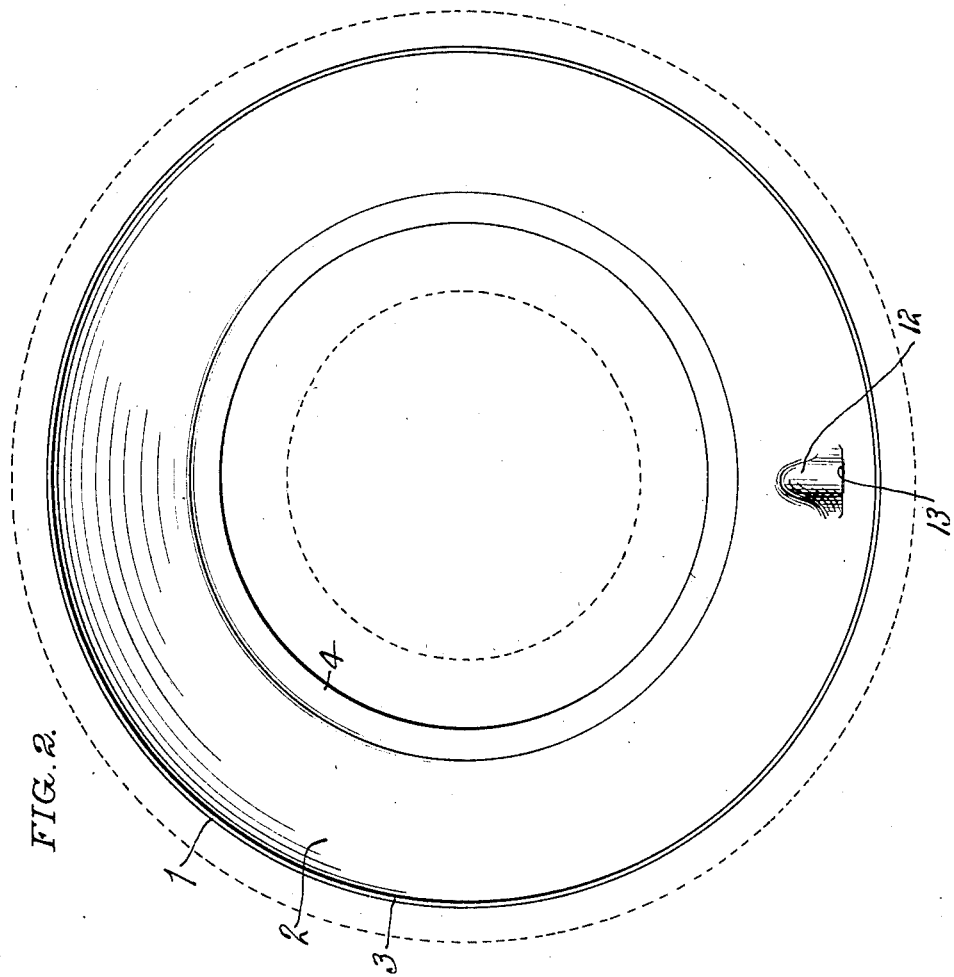
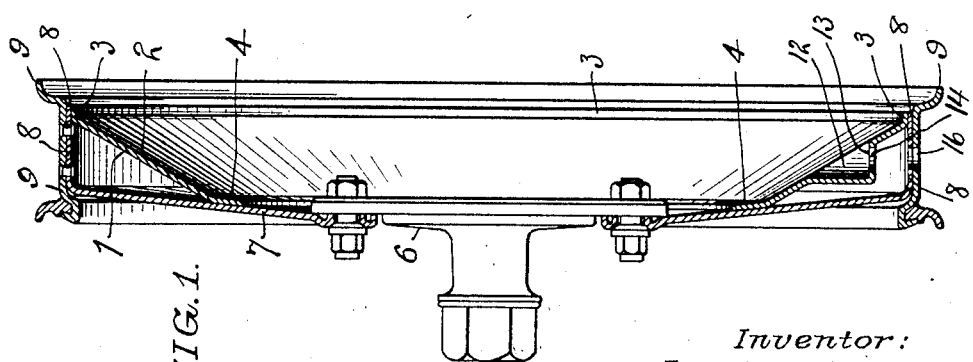
Inventor:
Joseph A. Steinmetz
By P. DeWitt Goodwin
Attorney Patented Oct. 16, 1923.

1,471,014

UNITED STATES PATENT OFFICE.

JOSEPH A. STEINMETZ, OF PHILADELPHIA, PENNSYLVANIA.

DISK WHEEL.

Application filed April 18, 1922. Serial No. 555,133.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in a Disk Wheel, of which the following is a specification.

My invention relates to improvements in a disk wheel for automobiles and the like, and particularly relates to a wheel of the single disk type, having a cylindrical rim plate formed upon the periphery of the disk and extending at right angles thereto, in one direction, and thus forming part of the rim for carrying the tire.

The object of my invention is to construct a disk wheel with a plate forming an annular brace or bracket adapted to be secured between the disk and the cylindrical flange, for bracing the edge of the cylindrical flange to the disk, thus giving the flange additional support; and a further object of my invention is to arrange the said anular plate upon the wheel in such a manner that it will form a guard to prevent the accumulation of stones and dirt upon the inner cylindrical surface of the rim, which, heretofore, were carried upon the wheel until they were thrown off by the motion of the wheel.

Referring to the accompanying drawing, Fig. 1, is a vertical section of a disk wheel showing my invention embodied therein; and Fig. 2, is a side elevation of my improved annular plate flange detached from the wheel and showing the latter in dotted lines.

In the accompanying drawing, in which like reference characters refer to like parts, 1 represents the annular flange, consisting of a plate 2 of conical formation. The plate 2 is provided with an outer edge flange 3 and an inner edge flange 4.

The wheel upon which my improvement may be embodied consists of a hub 6 to which is detachably secured the disk 7. Said disk 7 has a cylindrical rim plate 8 formed upon its periphery, and positioned nearly at right angles to the disk 7, and extending in one direction towards the inside of the wheel. Said rim plate 8 is adapted to have secured thereon the rim 9, upon which a tire may be mounted, in the usual manner.

The annular flange 1 is adapted to be positioned upon the wheel so as to form a triangular brace extending between the disk 7 and the cylindrical rim plate 8. The outer edge flange 3, of the flange plate 1. is cylindrical, and is adapted to be secured to the rim plate 8, by welding the joint between said parts. The inner edge flange 4, of the flange plate 1, extends parallel with the disk 7 and is also adapted to be secured to the disk by welding. Said plate flange 1 may be secured to the wheel by welding the joints throughout the entire length of the joints, or by spot welding. When the latter method is used the interior of the chamber formed between the plate flange and the wheel may have a water-proofing material injected through the valve aperture, so as to fill the joints and make them water tight, thus preventing the admission of water and dirt.

The plate flange 1 is provided with a depressed portion 12, adapted to be occupied by the tire valve, (not shown in the drawing). A bearing surface 13 is provided at the bottom of the said depressed portion 12, having an opening 14 formed through the same for the passage of the valve stem of a tire. Said bearing surface 13 forms a shoulder against which a valve stem cap may be secured upon the valve stem. The said opening 14, formed in the bearing surface 13 is in radial alignment with the opening 16 formed through the rim for the valve stem. Said bearing surface 13 thus forming an additional support for the valve stem, insuring the latter being held in a radial position, and reducing the tendency of the inner tube to cut around the valve stem, due to the creeping of the tire upon the wheel, and the tilting of the valve stem when not tightly clamped to the rim.

A wheel constructed in accordance with my invention has greater strength than a disk wheel of the ordinary construction, as the annular plate flange forms a brace for supporting the inner edge of the rim plate. Said flange also forms a shield which prevents the accumulation of dirt and stones upon the inner surface of the rim plate.

Having thus described my invention, I claim and desire to secure by Letters Patent:

1. An annular bracket having a conical portion, a cylindrical outer edge portion adapted to be secured to the rim of a wheel, and an inner edge portion adapted to be secured to the disk of a disk wheel, and said bracket forming an anular fillet between the rim and the disk of a wheel.

2. An automobile wheel comprising a disk, a cylindrical rim plate formed upon the disk having in combination, an annular conical member adapted to have the edges thereof secured to the said cylindrical rim plate and to the disk for strengthening the wheel and for preventing the accumulation of foreign matter upon the inner surface of the cylindrical flange.

3. A disk wheel comprising a cylindrical rim plate, a disk extending from one edge of the rim plate towards the hub of the wheel, an annular plate having one edge thereof secured to the free edge of the said rim and its other edge secured to the disk, said plate positioned upon the wheel so as to form a triangular brace construction between the disk and the outer edge of the cylindrical rim plate.

4. An automobile wheel of the single disk type including a rim plate mounted upon the disk and forming part of the tire rim, said rim plate provided with an aperture through which a tire valve stem projects, having in combination, an annular member adapted to be positioned in the angle formed between the disk and the said rim plate, said member having its edges secured to the disk and to the rim plate, said member having a depressed portion forming a recess adapted to be occupied by the tire valve stem, and a bearing surface formed upon said member positioned adjacent to said depressed portion against which a valve stem cap may be clamped when screwed upon the valve stem.

In testimony whereof I affix my signature.

JOSEPH A. STEINMETZ.